US012626923B2

(12) United States Patent
Ogi et al.

(10) Patent No.:  US 12,626,923 B2
(45) Date of Patent:        May 12, 2026

(54) ENERGY STORAGE DEVICE AND METHOD FOR MANUFACTURING ENERGY STORAGE DEVICE

(71) Applicant: GS Yuasa International Ltd., Kyoto (JP)

(72) Inventors: Kenta Ogi, Kyoto (JP); Yuhei Itai, Kyoto (JP); Kei Kumabayashi, Kyoto (JP); Fumiya Nakano, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 790 days.

(21) Appl. No.: 17/777,479

(22) PCT Filed: Nov. 5, 2020

(86) PCT No.: PCT/JP2020/041311

§ 371 (c)(1),
(2) Date: May 17, 2022

(87) PCT Pub. No.: WO2021/100470

PCT Pub. Date: May 27, 2021

(65) Prior Publication Data

US 2022/0407069 A1      Dec. 22, 2022

(30) Foreign Application Priority Data

Nov. 18, 2019    (JP) ................................. 2019-208235

(51) Int. Cl.
| | |
|---|---|
| *H01M 4/587* | (2010.01) |
| *H01G 11/26* | (2013.01) |

(Continued)

(52) U.S. Cl.
CPC ........... *H01M 4/587* (2013.01); *H01M 4/133* (2013.01); *H01M 4/1393* (2013.01);
(Continued)

(58) Field of Classification Search
CPC .... H01M 4/587; H01M 4/133; H01M 4/1393; H01M 2004/021; H01M 2004/027;
(Continued)

(56) References Cited

U.S. PATENT DOCUMENTS

| | | |
|---|---|---|
| 8,338,033 B2 | 12/2012 | Shimizu et al. |
| 10,347,908 B2 | 7/2019 | Shin et al. |

(Continued)

FOREIGN PATENT DOCUMENTS

| | | | |
|---|---|---|---|
| JP | 2003151535 A | * | 5/2003 |
| JP | 2003-217585 A | | 7/2003 |

(Continued)

OTHER PUBLICATIONS

International Search Report (ISR) dated Dec. 1, 2020 filed in PCT/JP2020/041311.

*Primary Examiner* — Daniel S Gatewood
(74) *Attorney, Agent, or Firm* — RANKIN, HILL & CLARK LLP

(57) ABSTRACT

An energy storage device according to one aspect of the present invention is an energy storage device including a negative electrode having a negative electrode substrate and a negative active material layer stacked on the negative electrode substrate directly or via another layer, and a nonaqueous electrolyte solution, in which the negative active material layer contains graphite and a solvent-based binder, and the negative active material layer is not subjected to pressing.

16 Claims, 4 Drawing Sheets

(51) Int. Cl.

| | | |
|---|---|---|
| *H01G 11/38* | (2013.01) | |
| *H01G 11/86* | (2013.01) | |
| *H01M 4/02* | (2006.01) | |
| *H01M 4/133* | (2010.01) | |
| *H01M 4/1393* | (2010.01) | |

(52) U.S. Cl.

CPC .............. *H01G 11/26* (2013.01); *H01G 11/38* (2013.01); *H01G 11/86* (2013.01); *H01M 2004/021* (2013.01); *H01M 2004/027* (2013.01)

(58) Field of Classification Search

CPC .... H01M 10/0587; H01M 4/62; H01G 11/26; H01G 11/38; H01G 11/86; H01G 11/70; H01G 11/06; H01G 11/32

See application file for complete search history.

(56) References Cited

U.S. PATENT DOCUMENTS

| | | | |
|---|---|---|---|
| 2007/0275302 A1 | 11/2007 | Sotowa et al. | |
| 2010/0279172 A1 * | 11/2010 | Hwang ................. | H01M 4/133 429/219 |
| 2011/0033754 A1 | 2/2011 | Shimizu et al. | |
| 2011/0193014 A1 | 8/2011 | Sotowa et al. | |
| 2013/0266849 A1 * | 10/2013 | Hara ..................... | H01M 4/364 429/211 |
| 2015/0162584 A1 | 6/2015 | Uematsu et al. | |
| 2015/0162640 A1 | 6/2015 | Waseda et al. | |
| 2016/0156025 A1 | 6/2016 | Shin et al. | |
| 2019/0036095 A1 | 1/2019 | Uematsu et al. | |
| 2019/0237763 A1 | 8/2019 | Wakizaka et al. | |
| 2019/0341600 A1 * | 11/2019 | Matsuu ................. | H01M 4/505 |

FOREIGN PATENT DOCUMENTS

| | | | |
|---|---|---|---|
| JP | 2005-222933 A | 8/2005 | |
| JP | 2011040179 A | 2/2011 | |
| JP | 2012-129170 A | 7/2012 | |
| JP | 2014-167938 A | 9/2014 | |
| JP | 2014165156 A | 9/2014 | |
| JP | 5626273 B2 | 11/2014 | |
| JP | 2015-005474 A | 1/2015 | |
| JP | 2016103337 A | 6/2016 | |
| WO | 2017/221895 A1 | 12/2017 | |
| WO | WO-2018135253 A1 * | 7/2018 | ........ H01M 10/0525 |

* cited by examiner

ENERGY STORAGE DEVICE AND METHOD FOR MANUFACTURING ENERGY STORAGE DEVICE

TECHNICAL FIELD

The present invention relates to an energy storage device and a method for manufacturing the energy storage device.

BACKGROUND ART

Nonaqueous electrolyte solution secondary batteries typified by lithium ion nonaqueous electrolyte solution secondary batteries are widely in use for electronic equipment such as personal computers and communication terminals, automobiles, and the like because the batteries have high energy density. The nonaqueous electrolyte solution secondary battery is generally provided with an electrode assembly, having a pair of electrodes electrically isolated by a separator, and a nonaqueous electrolyte solution interposed between the electrodes and is configured to charge and discharge by transferring ions between both the electrodes. Capacitors such as lithium ion capacitors and electric double-layer capacitors are also widely in use as energy storage devices except for the nonaqueous electrolyte solution secondary batteries.

As a negative active material of the energy storage device, a carbon material such as graphite is used (see Patent Document 1). Patent Document 1 describes an invention of a negative electrode material for a lithium battery containing a carbon-based negative active material with a specific surface area of 1 m²/g or more, a binder material made of styrene butadiene rubber (SBR), and carbon fibers with a fiber diameter of 1 to 1000 nm. Patent Document 1 describes that a negative electrode material composition is applied to a current collector foil, dried, and then subjected to pressing to prepare a negative electrode material.

PRIOR ART DOCUMENT

Patent Document

Patent Document 1: JP-A-2005-222933

SUMMARY OF THE INVENTION

Problems to be Solved by the Invention

In an energy storage device including a negative electrode having a carbon material as a negative active material and SBR which is a water-based binder as a binder material (binder) as described in Patent Document 1, durability is not sufficient. Specifically, the inventors have confirmed that the energy storage device having the above configuration has a low capacity retention ratio after being left in a charged state.

An object of the present invention is to provide an energy storage device which uses graphite as a negative active material and has a high capacity retention ratio after being left in a charged state, and a method for manufacturing the energy storage device.

Means for Solving the Problems

An energy storage device according to one aspect of the present invention is an energy storage device including a negative electrode having a negative electrode substrate and a negative active material layer stacked on the negative electrode substrate directly or via another layer, and a nonaqueous electrolyte solution, in which the negative active material layer contains graphite and a solvent-based binder, and the negative active material layer is not subjected to pressing.

An energy storage device according to another aspect of the present invention is an energy storage device including a negative electrode having a negative electrode substrate and a negative active material layer stacked on the negative electrode substrate directly or via another layer, and a nonaqueous electrolyte solution, in which the negative active material layer contains graphite and a solvent-based binder, and a ratio of surface roughness of the negative electrode substrate in a region without the negative active material layer stacked to surface roughness of the negative electrode substrate in a region with the negative active material layer stacked is 0.90 or more.

A method for manufacturing an energy storage device according to another aspect of the present invention is a method for manufacturing an energy storage device, the method including stacking a negative active material layer on a negative electrode substrate directly or via another layer; and preparing a nonaqueous electrolyte solution, in which the negative active material layer contains graphite and a solvent-based binder; and the method does not include subjecting the negative active material layer to pressing.

Advantages of the Invention

According to one aspect of the present invention, it is possible to provide an energy storage device that uses graphite as a negative active material and has a high capacity retention ratio after being left in a charged state, and a method for manufacturing the energy storage device.

MODE FOR CARRYING OUT THE INVENTION

Figure 1:
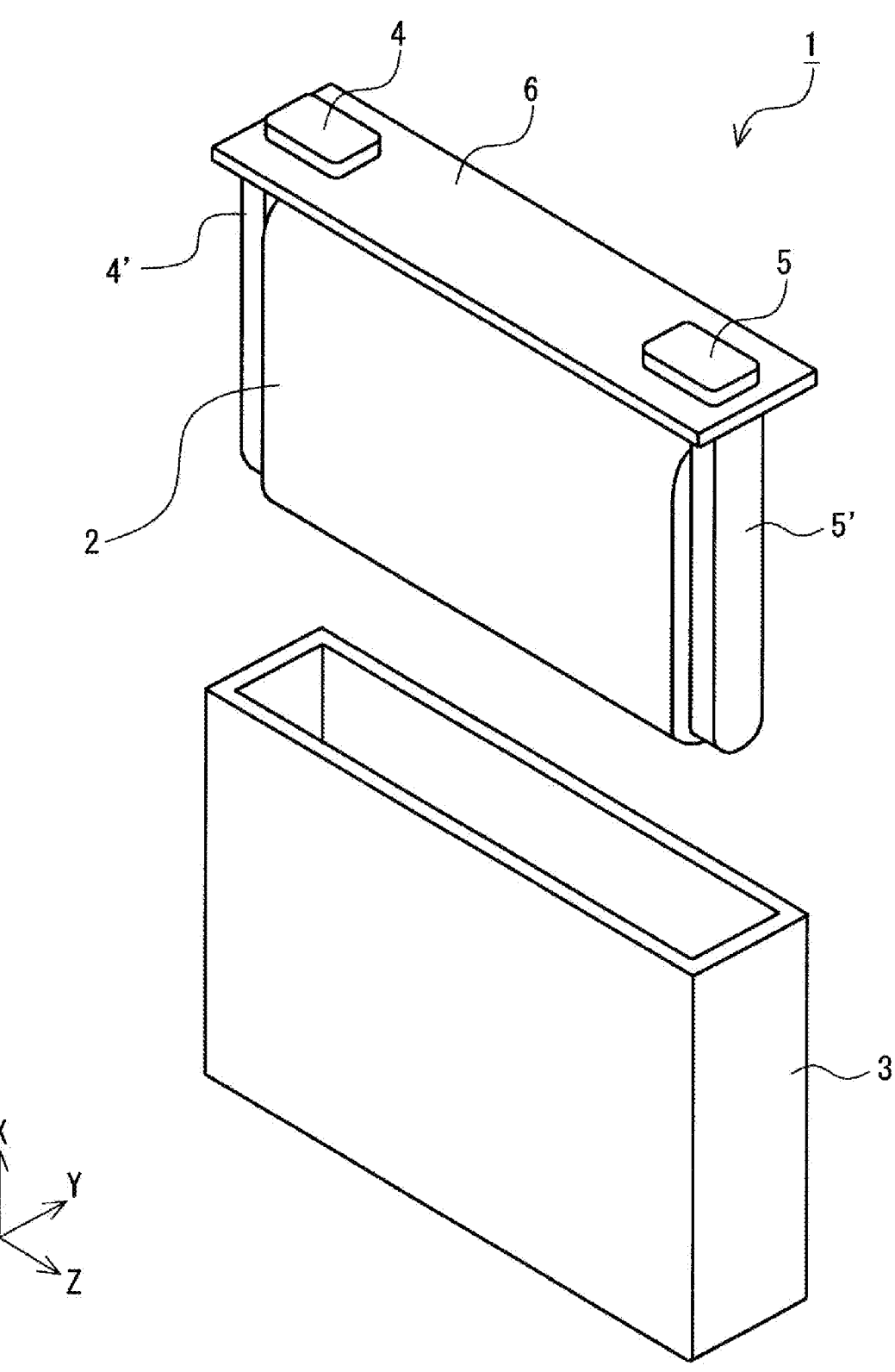
FIG. 1 is a schematic exploded perspective view illustrating an energy storage device in one embodiment of the present invention.

First, outlines of an energy storage device and a method for manufacturing the energy storage device disclosed in the present specification will be described.

An energy storage device according to one aspect of the present invention is an energy storage device (A) including a negative electrode having a negative electrode substrate and a negative active material layer stacked on the negative electrode substrate directly or via another layer, and a nonaqueous electrolyte solution, in which the negative active material layer contains graphite and a solvent-based binder, and the negative active material layer is not subjected to pressing.

The energy storage device (A) is an energy storage device using graphite as a negative active material, and has a high capacity retention ratio after being left in a charged state. The reason for this is not clear, but is presumed as follows. A water-based binder such as SBR has low swellability with respect to the nonaqueous electrolyte solution, and the amount of the nonaqueous electrolyte solution in the vicinity of the water-based binder is less than the other portions, so that the water-based binder tends to be a resistance component at the time of charging and discharging. For this reason, when the water-based binder is used in the negative active material layer, the vicinity of the water-based binder in the negative electrode has high resistance, so that ion migration at an interface between the negative active material and the nonaqueous electrolyte solution becomes uneven, and reaction unevenness of the negative electrode is likely to occur. In the energy storage device in which the reaction unevenness of the negative electrode occurs, it is considered that when the energy storage device is left in a charged state, deterioration of the energy storage device material caused by the reaction unevenness progresses, and capacity after being left is likely to decrease. On the other hand, when a solvent-based binder having high swellability with respect to the nonaqueous electrolyte solution is used in the negative active material layer, it is considered that ion migration at the interface between the negative active material and the nonaqueous electrolyte solution is maintained in a highly uniform state, the reaction unevenness of the negative electrode is suppressed, and a decrease in capacity after being left is also suppressed. In addition, expansion of the negative electrode occurs as lithium ions are inserted into graphite at initial charge, but when the negative active material layer is pressed in the manufacturing process, particularly uneven expansion is likely to occur due to release of residual stress due to pressing. When the expansion of the negative electrode is uneven, unevenness occurs in the distance between a positive electrode and the negative electrode, and this is also considered to be a factor causing reaction unevenness. Furthermore, it is also considered that when the negative active material layer is pressed, the charge-discharge performance of graphite itself is deteriorated due to peeling of surface coating of graphite, or the like. On the other hand, when the negative active material layer is not subjected to pressing, the above-described reaction unevenness is also suppressed, and the deterioration of the charge-discharge performance of graphite is also suppressed. From the above, it is presumed that the energy storage device (A) in which the negative active material layer contains graphite and a solvent-based binder and the negative active material layer is not subjected to pressing can exhibit an effect of having a high capacity retention ratio after being left in a charged state.

The term "graphite" refers to a carbon material in which an average lattice distance ($d_{002}$) of the (002) plane determined by an X-ray diffraction method before charging/discharging or in a discharged state is 0.33 nm or more and less than 0.34 nm. Here, the "discharged state" refers to a state where an open circuit voltage is 0.7 V or more in a unipolar battery using a negative electrode, containing a carbon material as a negative active material, as a working electrode and using metallic Li as a counter electrode. Since the potential of the metallic Li counter electrode in an open circuit state is substantially equal to an oxidation/reduction potential of Li, the open circuit voltage in the unipolar battery is substantially equal to the potential of the negative electrode containing the carbon material with respect to the oxidation/reduction potential of Li. That is, the fact that the open circuit voltage in the unipolar battery is 0.7 V or more means that lithium ions that can be occluded and released in association with charge-discharge are sufficiently released from the carbon material that is the negative active material. The "solvent-based binder" refers to a binder that is dispersed or dissolved in an organic solvent.

The phrase "not subjected to pressing" means that a step of applying a pressure (linear pressure) of 10 kgf/mm or more to the negative active material layer by an apparatus intended for applying a pressure to a workpiece, such as a roll press, is not carried out during manufacture. That is, the phrase "not subjected to pressing" also includes a case where a slight pressure is applied to the negative active material layer in other steps such as a step of winding the negative electrode. The phrase "not subjected to pressing" includes a case where a step of applying a pressure (linear pressure) of less than 10 kgf/mm is carried out.

An energy storage device according to another aspect of the present invention is an energy storage device (B) including a negative electrode having a negative electrode substrate and a negative active material layer stacked on the negative electrode substrate directly or via another layer, and a nonaqueous electrolyte solution, in which the negative active material layer contains graphite and a solvent-based binder, and R2/R1 that is a ratio of the surface roughness R2 of the negative electrode substrate in a region without the negative active material layer stacked to the surface roughness R1 of the negative electrode substrate in a region with the negative active material layer stacked is 0.90 or more.

The energy storage device (B) is an energy storage device using graphite as a negative active material, and has a high capacity retention ratio after being left in a charged state. In the negative electrode in which the negative active material layer is stacked on the negative electrode substrate, as the negative active material layer is more strongly pressed, the surface roughness R1 of the region with the negative active material layer stacked in the negative electrode substrate increases, and thus reducing the ratio to the surface roughness R2 of the region without the negative active material layer stacked (R2/R1). In other words, when the negative active material layer is not subjected to pressing, the surface roughness has almost the same value in the region with the negative active material layer disposed and the region without the negative active material layer disposed in the negative electrode substrate (for example, an exposed region of the negative electrode substrate in the case where the negative electrode has an exposed part of the negative electrode substrate). More specifically, the ratio (R2/R1) will be brought close to 1. In the energy storage device (B), the foregoing means the ratio (R2/R1) of 0.90 or more, without the pressure applied to the negative active material layer stacked on the negative electrode substrate or with a low pressure applied thereto. In the energy storage device (B), as in the energy storage device (A) described above, a solvent-based binder is used as the binder of the negative active material layer. Therefore, in the energy storage device (B), for the same reason as in the energy storage device (A) described above, it is presumed that the effect that the capacity retention ratio after being left in a charged state is high can be exhibited.

The "surface roughness" of the negative electrode substrate means a value obtained by measuring arithmetic mean roughness Ra of a surface (for a region where the negative active material layer and other layers are stacked, a surface after these layers are removed) of the negative electrode substrate with a laser microscope in accordance with JIS-B0601 (2013). Specifically, the measured value can be obtained by the following method. First, in the case where the negative electrode has an exposed part of the negative electrode substrate, the surface roughness of the part is measured in accordance with JIS-B0601 (2013) with the use of a commercially available laser microscope (device name "VK-8510" from KEYENCE CORPORATION), as the surface roughness R2 of the region without the negative active material layer disposed. In this regard, as measurement conditions, a measurement region (area) is 149 μm×112 μm (16688 μm$^2$), and a measurement pitch is 0.1 μm. Then, the negative active material layer and the other layers are removed from the negative electrode substrate by shaking the negative electrode with the use of an ultrasonic cleaner. The surface roughness R1 of the region with the negative active material layer stacked is measured by the same method as for the surface roughness of the part where the negative electrode substrate is exposed. It is to be noted that in the case where the negative electrode has no exposed part of the negative electrode substrate (for example, in the case where the entire surface of the negative electrode substrate is covered with the intermediate layer), the surface roughness R2 of the region without the negative active material layer disposed (for example, the region covered with the intermediate layer, and without the negative active material layer disposed) will be measured by the same method. The shaking with an ultrasonic cleaner used can be performed by shaking while immersing in water for 3 minutes and then in ethanol for 1 minute with the use of a desktop ultrasonic cleaner "2510J-DTH" from Branson Ultrasonics, Emerson Japan, Ltd.

In the energy storage device (A) and the energy storage device (B), the graphite preferably contains solid graphite. When the graphite contains solid graphite, the capacity retention ratio after being left in a charged state tends to be further increased. The reason for this is not clear, but it is presumed that when the graphite is solid, the density in the graphite particles is uniform, and current concentration hardly occurs, so that reaction unevenness in the negative electrode is further reduced. In addition, when the graphite contains solid graphite, uneven expansion of the negative electrode can be suppressed, and expansion at initial charge is also reduced.

The term "solid" means that the inside of the particle is filled substantially without voids. Specifically, the solid means that the area ratio excluding voids in a particle to the area of the entire particle is 95% or more in the cross section of the particle observed in a scanning electron microscope (SEM) image obtained with the use of an SEM. In one preferred aspect, the area ratio of the solid graphite particles can be 97% or more (e.g. 98% or more). The upper limit of the area ratio of the solid graphite particles may be 100%. The area ratio R can be determined as follows.

(1) Preparation of Sample for Measurement

The graphite particles to be measured are fixed with a thermosetting resin. A cross-section polisher is used to expose the cross section of the graphite particles fixed with resin to produce a sample for measurement.

(2) Acquisition of SEM (Scanning Electron Microscope) Image.

For acquiring the SEM image, JSM-7001F (manufactured by JEOL Ltd.) is used as a scanning electron microscope. As the SEM image, a secondary electron image is observed. An acceleration voltage is 15 kV.

An observation magnification is set so that the number of graphite particles appearing in one field of view is 3 or more and 15 or less. The obtained SEM image is stored as an image file. In addition, various conditions such as spot diameter, working distance, irradiation current, luminance, and focus are appropriately set so as to make the contour of the graphite particle clear.

(3) Cut-Out of Contour of Graphite Particle

The contour of the graphite particle is cut out from the acquired SEM image by using an image cutting function of an image editing software Adobe Photoshop Elements 11. The contour is cut out by using a quick selection tool to select the outside of the contour of the graphite particle and edit a portion except for the graphite particle to a black background. At this time, when the number of the graphite particles from which the contours have been able to be cut out is less than three, the SEM image is acquired again, and the cutout is performed until the number of the graphite particles from which the contours have been able to be cut out becomes three or more.

(4) Binarization Processing

The image of the first graphite particle among the cut-out graphite particles is binarized by using image analysis software PopImaging 6.00 to set to a threshold value a concentration 20% lower than a concentration at which the intensity becomes maximum. By the binarization processing, an area on the low-concentration side is calculated to obtain "an area $S_1$ excluding voids in the particles". Next, the image of the same first graphite particle is binarized using a concentration 10 as a threshold value. The outer edge of the graphite particle is determined by the binarization processing, and the area inside the outer edge is calculated to obtain an "area $S_0$ of the whole particle". By calculating $S_1$ relative to $S_0$ ($S_1/S_0$) by using $S_1$ and $S_0$ calculated above, "an area ratio $R_1$ ($=S_1/S_0$) excluding voids in the particles relative to the area of the entire particle" in the first graphite particle is determined. The images of the second and subsequent graphite particles among the cut-out graphite particles are also subjected to the binarization processing described above, and the areas $S_1$ and $S_0$ are calculated. Based on the calculated areas $S_1$, $S_0$, area ratios $R_2$, $R_3$, . . . of the respective graphite particles are calculated.

(5) Determination of Area Ratio R

By calculating the average value of all the area ratios $R_1$, $R_2$, $R_3$, . . . calculated by the binarization processing, "the area ratio R of the graphite particles excluding voids in the particles relative to the total area of the particles" is determined.

In the energy storage device (A) and the energy storage device (B), the average particle size of graphite is preferably 10 μm or less. In such a case, the capacity retention ratio after being left in a charged state tends to be further increased. The reason for this is not clear, but it is presumed that when the average particle size of graphite is small, the density of the negative active material layer is made uniform, and current concentration hardly occurs, so that reaction unevenness in the negative electrode is further reduced, and the like.

The term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013). Specifically, the measured value can be obtained by the following method. A laser diffraction type particle size distribution measuring apparatus ("SALD-2200" manufactured by Shimadzu Corporation) is used as a measuring apparatus, and Wing SALD-2200 is used as measurement control software. A scattering measurement mode is adopted, and a wet cell, in which a dispersion liquid with a measurement sample dispersed in a dispersion solvent circulates, is irradiated with a laser beam to obtain a scattered light distribution from the measurement sample. The scattered light distribution is approximated by a log-normal distribution, and a particle size corresponding to an accumulation degree of 50% is defined as an average particle size (D50).

A method for manufacturing an energy storage device according to another aspect of the present invention is a method for manufacturing an energy storage device, the method including stacking a negative active material layer on a negative electrode substrate directly or via another layer; and preparing a nonaqueous electrolyte solution, in which the negative active material layer contains graphite and a solvent-based binder; and the method does not include subjecting the negative active material layer to pressing.

According to the manufacturing method, it is possible to manufacture an energy storage device that uses graphite as a negative active material and has a high capacity retention ratio after being left in a charged state.

Hereinafter, the energy storage device according to an embodiment of the present invention, the method for manufacturing the energy storage device, and other embodiments will be described in detail. The names of the respective constituent members (respective constituent elements) used in the respective embodiments may be different from the names of the respective constituent members (respective constituent elements) used in the background art.

<Energy Storage Device>

An energy storage device according to an embodiment of the present invention includes a positive electrode, a negative electrode, and a nonaqueous electrolyte solution. The positive electrode and the negative electrode usually form an electrode assembly stacked or wound with a separator interposed therebetween. This electrode assembly is housed in a case, and a nonaqueous electrolyte solution is filled in this case. The nonaqueous electrolyte solution is interposed between the positive electrode and the negative electrode. A nonaqueous electrolyte solution secondary battery (hereinafter, also simply referred to as a "secondary battery") will be described as an example of the energy storage device.

[Positive Electrode]

The positive electrode has a positive electrode substrate, and a positive active material layer stacked on the positive electrode substrate directly or via an intermediate layer that is another layer.

(Positive Electrode Substrate)

The positive electrode substrate is a substrate having conductivity. Having "conductivity" means having a volume resistivity of $10^7$ $\Omega \cdot$cm or less that is measured in accordance with JIS-H-0505 (1975), and the term "non-conductivity" means that the volume resistivity is more than $10^7$ $\Omega \cdot$cm. As the material of the positive electrode substrate, a metal such as aluminum, titanium, tantalum, or stainless steel, or an alloy thereof is used. Among them, aluminum or an aluminum alloy is preferable from the viewpoint of electric potential resistance, high conductivity, and costs. Examples of the positive electrode substrate include a foil and a deposited film, and a foil is preferable from the viewpoint of costs. Therefore, the positive electrode substrate is preferably an aluminum foil or an aluminum alloy foil. Examples of the aluminum or aluminum alloy include A1085 and A3003 specified in JIS-H-4000 (2014).

The average thickness of the positive electrode substrate is preferably 3 μm or more and 50 μm or less, more preferably 5 μm or more and 40 μm or less, still more preferably 8 μm or more and 30 μm or less, and particularly preferably 10 μm or more and 25 μm or less. When the average thickness of the positive electrode substrate is in the above range, it is possible to enhance the energy density per volume of a secondary battery while increasing the strength of the positive electrode substrate. The "average thickness" refers to a value obtained by dividing the mass of a substrate having a predetermined area by the true density and area of the substrate. The same definition applies when the "average thickness" is used for the negative electrode substrate.

(Intermediate Layer)

The intermediate layer is a layer arranged between the positive electrode substrate and the positive active material layer. The intermediate layer contains conductive particles such as carbon particles to reduce contact resistance between the positive electrode substrate and the positive active material layer. The configuration of the intermediate layer is not particularly limited, and includes, for example, a resin binder and conductive particles. The intermediate layer may cover a part or the entire surface of the positive electrode substrate.

(Positive Active Material Layer)

The positive active material layer contains a positive active material. The positive active material layer contains optional components such as a conductive agent, a binder (binding material), a thickener and a filler as necessary.

The positive active material can be appropriately selected from known positive active materials. As the positive active material for a lithium ion secondary battery, a material capable of storing and releasing lithium ions is usually used. Examples of the positive active material include lithium transition metal composite oxides having an α—NaFeO$_2$-type crystal structure, lithium transition metal oxides having a spinel-type crystal structure, polyanion compounds, chalcogenides, and sulfur. Examples of the lithium transition metal composite oxide having an α—NaFeO$_2$ type crystal structure include $Li[Li_xNi_{1-x}]O_2$ ($0 \leq x < 0.5$), $Li[Li_xNi_\gamma Co_{1-x-\gamma}]O_2$ ($0 \leq x < 0.5$, $0 < \gamma < 1$), $Li[Li_xCo_{1-x}]O_2$ ($0 \leq x < 0.5$), $Li[Li_xNi_\gamma Mn_{1-x-\gamma}]O_2$ ($0 \leq x < 0.5$, $0 < \gamma < 1$), $Li_xLi_\gamma Ni_\gamma Mn_\beta Co_{1-x-\gamma-\beta}]O_2$ ($0 \leq x < 0.5$, $0 < \gamma$, $0 < \beta$, $0.5 < \gamma + \beta < 1$), and $Li[Li_xNi_\gamma Co_\beta Al_{1-x-\gamma-\beta}]O_2$ ($0 \leq x < 0.5$, $0 < \gamma$, $0 < \beta$, $0.5 < \gamma + \beta < 1$). Examples of the lithium transition metal oxide having a spinel-type crystal structure include $Li_xMn_2O_4$ and $Li_xNi_\gamma Mn_{2-\gamma}O_4$. Examples of the polyanion compounds include $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. A part of atoms or polyanions in these materials may be substituted with atoms or anion species composed of other elements. The surfaces of these materials may be coated with other materials. In the positive active material layer, one of these materials may be used singly or two or more of these materials may be used in mixture. In a preferred aspect, the positive active material may be a lithium nickel-containing composite oxide containing nickel as a transition metal. Also, in a preferred aspect, the positive active material may be a lithium-nickel-cobalt-manganese-containing composite oxide containing nickel, cobalt and manganese as transition metals.

The positive active material is usually particles (powder). The average particle size of the positive active material is preferably 0.1 μm or more and 20 μm or less, for example. By setting the average particle size of the positive active material to be equal to or greater than the lower limit, the positive active material is easily manufactured or handled. By setting the average particle size of the positive active material to be equal to or less than the upper limit, the electron conductivity of the positive active material layer is improved. When a composite of the positive active material and other materials is used, the average particle diameter of the composite is defined as the average particle size of the positive active material.

A crusher, a classifier, and the like are used to obtain a powder having a predetermined particle size. Examples of a crushing method include a method in which a mortar, a ball mill, a sand mill, a vibratory ball mill, a planetary ball mill, a jet mill, a counter jet mill, a whirling airflow type jet mill, or a sieve or the like is used. At the time of crushing, wet type crushing in the presence of water or an organic solvent such as hexane can also be used. As a classification method, a sieve or a wind force classifier or the like is used based on the necessity both in dry manner and in wet manner.

The content of the positive active material in the positive active material layer is preferably 50% by mass or more and 99% by mass or less, more preferably 70% by mass or more and 98% by mass or less, still more preferably 80% by mass or more and 95% by mass or less. When the content of the positive active material is in the above range, it is possible to achieve both high energy density and productivity of the positive active material layer.

The conductive agent is not particularly limited as long as it is a material exhibiting conductivity. Examples of such a conductive agent include carbonaceous materials, metals, and conductive ceramics. Examples of the carbonaceous materials include graphitized carbon, non-graphitized carbon, and graphene-based carbon. Examples of the non-graphitized carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly or two or more of these materials may be used in mixture. These materials may be composited and used. For example, a material obtained by compositing carbon black with CNT may be used. Among them, carbon black is preferable from the viewpoint of electron conductivity and coatability, and in particular, acetylene black is preferable.

The content of the conductive agent in the positive active material layer is preferably 1% by mass or more and 10% by mass or less, more preferably 3% by mass or more and 9% by mass or less. By setting the content of the conductive agent in the above range, the energy density of the secondary battery can be enhanced.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as ethylene-propylene-diene rubber (EPDM), sulfonated EPDM, styrene-butadiene rubber (SBR), and fluororubber; and polysaccharide polymers.

The content of the binder in the positive active material layer is preferably 1% by mass or more and 10% by mass or less, more preferably 2% by mass or more and 9% by mass or less (for example, 3% by mass or more and 6% by mass or less). When the content of the binder is in the above range, the active material can be stably held.

Examples of the thickener include polysaccharide polymers such as carboxymethylcellulose (CMC) and methylcellulose. When the thickener has a functional group reactive with lithium and the like, the functional group may be deactivated by methylation or the like in advance. When a thickener is used, the ratio of the thickener to the entire positive active material layer can be about 8% by mass or less, and is preferably usually about 5.0% by mass or less (e.g. 1.0% by mass or less). The technique disclosed herein can be preferably carried out in an aspect in which the positive active material layer does not contain a thickener.

The filler is not particularly limited. Examples of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof. When a filler is used, the ratio of the filler to the entire positive active material layer can be about 8.0% by mass or less, and is preferably usually about 5.0% by mass or less (e.g. 1.0% by mass or less). The technique disclosed herein can be preferably carried out in an aspect in which the positive active material layer does not contain a filler.

The positive active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

[Negative Electrode]

The negative electrode has a negative electrode substrate, and a negative active material layer stacked on the negative electrode substrate directly or via an intermediate layer that is another layer. The configuration of the intermediate layer is not particularly limited, and can be selected from the configurations exemplified for the positive electrode, for example. The intermediate layer may cover a part or the entire surface of the negative electrode substrate. The negative active material layer is usually disposed along at least one surface of the negative electrode substrate. The negative electrode substrate may have a region without the negative active material layer stacked. The negative electrode substrate may have a region with the intermediate layer stacked and without the negative active material layer stacked.

(Negative Electrode Substrate)

The negative electrode substrate is a substrate having conductivity. As the material of the negative electrode substrate, a metal such as copper, nickel, stainless steel, or a nickel-plated steel or an alloy thereof is used, and copper or a copper alloy is preferable. Examples of the form of the negative electrode substrate include a foil, and a vapor deposition film, and a foil is preferred from the viewpoint of cost. That is, the negative electrode substrate is preferably a copper foil. Examples of the copper foil include rolled copper foil, electrolytic copper foil, and the like.

The average thickness of the negative electrode substrate is preferably 2 μm or more and 35 μm or less, more preferably 3 μm or more and 30 μm or less, still more preferably 4 μm or more and 25 μm or less, particularly preferably 5 μm or more and 20 μm or less. When the average thickness of the negative electrode substrate is in the above range, it is possible to enhance the energy density per volume of a secondary battery while increasing the strength of the negative electrode substrate.

(Negative Active Material Layer)

The negative active material layer contains graphite and a solvent-based binder. The graphite functions as a negative active material. The negative active material layer contains other negative active material, and optional components such as a conductive agent, a thickener and a filler as necessary. The optional components such as a conductive agent, a thickener and a filler can be selected from the materials exemplified for the positive electrode.

When a conductive agent is used in the negative active material layer, the ratio of the conductive agent to the entire negative active material layer can be about 10% by mass or less, and is preferably usually about 8.0% by mass or less (e.g. 3.0% by mass or less). The technique disclosed herein can be preferably carried out in an aspect in which the negative active material layer does not contain a conductive agent. When a thickener is used in the negative active material layer, the ratio of the thickener to the entire negative active material layer can be about 8% by mass or less, and is preferably usually about 5.0% by mass or less (e.g. 1.0% by mass or less). The technique disclosed herein can be preferably carried out in an aspect in which the negative active material layer does not contain a thickener. When a filler is used in the negative active material layer, the ratio of the filler to the entire negative active material layer can be about 8.0% by mass or less, and is preferably usually about 5.0% by mass or less (e.g. 1.0% by mass or less). The technique disclosed herein can be preferably carried out in an aspect in which the negative active material layer does not contain a filler.

The negative active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the solvent-based binder, the thickener, and the filler.

The graphite contained in the negative active material layer can be appropriately selected from various known graphite, and used. Examples of the known graphite include artificial graphite and natural graphite. Here, the artificial graphite is a generic term for artificially produced graphite. The natural graphite is a generic term for graphite obtained from natural minerals. Specific examples of the natural graphite include scale-like graphite (flake graphite), massive graphite, and earthy graphite. The graphite may be flat scale-like natural graphite or spheroidized natural graphite obtained by spheroidizing the scale-like natural graphite. In a preferred aspect, the graphite is artificial graphite. By using artificial graphite, the above-described effect can be more effectively exhibited. The graphite used in the negative active material layer may be graphite, the surfaces of which are coated (for example, with amorphous carbon coating).

The graphite contained in the negative active material layer is usually particulate. The graphite may be either solid graphite or hollow graphite. However, the graphite preferably contains solid graphite because the capacity retention ratio after being left in a charged state can be further increased, the expansion of the negative electrode at initial charge can be further suppressed, and the like. The content of the solid graphite in the graphite is preferably 20% by mass or more, more preferably 50% by mass or more, still more preferably 70% by mass or more, even more preferably 90% by mass or more, particularly preferably substantially 100% by mass. The hollow graphite is graphite in which voids are present inside the particles, and means graphite in which the above-described area ratio R is less than 95%. In one preferred aspect, the area ratio of the hollow graphite particles can be 92% or less (e.g. 90% or less). The lower limit of the area ratio of the hollow graphite particles may be, for example, 60%, 70%, or 80%.

The average lattice spacing ($d_{002}$) of graphite is 0.33 nm or more and less than 0.34 nm, preferably 0.335 nm or more and less than 0.338 nm.

The shape of the graphite particle is preferably a shape close to a true sphere but may have a spindle shape, a scale-like shape, a plate shape or the like and may have irregularities on the surface. The graphite particles may include particles in which a plurality of graphite particles are aggregated. The energy storage device disclosed herein can be preferably implemented in an aspect in which the energy storage device does not substantially contain scale-like graphite particles. As a result, the negative active material layer can have a high packing density despite being unpressed. In such an energy storage device, the battery capacity (energy density) per volume can be effectively increased, and the capacity retention ratio after being left in a charged state can be increased.

The negative active material layer disclosed herein may contain a plurality of kinds of graphite particles, or may contain only one kind of graphite particles. When the negative active material layer contains a plurality of kinds of graphite particles, the number of kinds of graphite particles contained in the negative active material layer can be generally grasped based on a difference in outer shapes of the plurality of kinds of graphite particles. The difference in the outer shape of the graphite particles can be, for example, at least one of a difference in average particle size, a difference in average aspect ratio, a difference in surface shape of the particles (for example, the presence or absence of irregularities on the surface and the degree thereof, the presence or absence of surface coating and the degree thereof), a difference in sparse or dense shape inside the particles, and the like. The outer shape of the graphite particles can be grasped from, for example, an SEM image. The negative active material layer disclosed herein can be preferably carried out in an aspect containing only one kind of graphite particles. As a result, the above-described effect can be more suitably exhibited while maximizing the advantage of using the one kind of graphite particles.

The aspect ratio of the graphite particles is preferably 1.0 or more and 5.0 or less, more preferably 2.0 or more and 4.0 or less. By setting the aspect ratio of the graphite particles in the above range, the graphite particles are close to spherical shape, and current concentration is less likely to occur, so that uneven expansion of the negative electrode and a decrease in the capacity retention ratio after being left in a charged state can be further suppressed. In addition, the negative active material layer can have a high packing density without pressing the negative active material layer. In such an energy storage device, the battery capacity (energy density) per volume can be effectively increased, and the capacity retention ratio after being left in a charged state can be increased.

The "aspect ratio" means the A/B value that is the ratio of the longest diameter A of the particle to the longest diameter B in the direction perpendicular to the diameter A in the cross section of the particle observed in the SEM image by the scanning electron microscope. The aspect ratio can be determined as follows.

(1) Preparation of Sample for Measurement

A sample for measurement having an exposed cross section used for determining the area ratio R described above is used.

(2) Acquisition of SEM Image

For acquiring the SEM image, JSM-7001F (manufactured by JEOL Ltd.) is used as a scanning electron microscope. The condition for acquiring the SEM image is to observe a secondary electron image. An acceleration voltage is 15 kV. An observation magnification is set so that the number of graphite particles appearing in one field of view is 100 or more and 1000 or less. The obtained SEM image is stored as an image file. In addition, various conditions such as spot diameter, working distance, irradiation current, luminance, and focus are appropriately set so as to make the contour of the graphite particle clear.

(3) Determination of Aspect Ratio

From the acquired SEM image, 100 graphite particles are randomly selected, and for each of the particles, the longest diameter A of the graphite particle and the longest diameter B in the direction perpendicular to the diameter A are measured to calculate the A/B value. The average value of all the calculated A/B values is calculated to determine the aspect ratio of the graphite particles.

The average particle size of graphite (graphite particles) may be, for example, 0.1 μm or more and 30 μm or less (typically 0.3 μm or more and 25 μm or less), but is preferably 0.5 μm or more and 15 μm or less, more preferably 1 μm or more and 10 μm or less, still more preferably 1.5 μm or more and 5 μm or less. In some embodiments, the average particle size of graphite may be, for example, 4 μm or less, typically 3 μm or less. By setting the average particle size of graphite to the above upper limit or less, the capacity retention ratio after being left in a charged state can be further increased. In addition, by setting the average particle size of graphite to be equal to or more than the above lower limit, ease of handling during manufacture and the like can be enhanced.

The true density of the graphite particles is preferably 2.1 g/cm$^3$ or more. By using the graphite particles having such a high true density, the energy density can be increased. Meanwhile, the upper limit of the true density of the graphite particles is, for example, 2.5 g/cm$^3$. The true density is measured by a gas volume method with a pycnometer that uses a helium gas.

The content of the graphite in all the negative active materials is preferably 50% by mass or more, and is more preferably 60% by mass or more, 70% by mass or more, 80% by mass or more, or 90% by mass or more in some cases. Also, the content of the graphite may be 100% by mass, and is more preferably 98% by mass or less or 95% by mass or less in some cases. The content of the solid graphite in all the negative active materials is preferably 50% by mass or more, and is more preferably 60% by mass or more, 70% by mass or more, 80% by mass or more, or 90% by mass or more in some cases. The content of the hollow graphite may be 100% by mass, and may be more preferably 98% by mass or less or 95% by mass or less in some cases. By setting the content of the graphite or solid graphite to be equal to or more than the above lower limit, it is possible to increase the capacity retention ratio after being left in a charged state, charge-discharge efficiency, and the like.

The content of the graphite in the negative active material layer is preferably 60% by mass or more and 99% by mass or less, more preferably 90% by mass or more and 98% by mass or less. When the content of the graphite is in the above range, it is possible to achieve both high energy density and productivity of the negative active material layer.

It is preferable that the negative active material layer contains non-graphitic carbon together with graphite as a negative active material in some cases. The term "non-graphitic carbon" refers to a carbon material in which the average lattice distance ($d_{002}$) of the (002) plane determined by the X-ray diffraction method before charging/discharging or in the discharged state is 0.34 nm or more and 0.42 nm or less. Examples of the non-graphitic carbon include hardly graphitizable carbon and easily graphitizable carbon, and hardly graphitizable carbon is preferable. Examples of the non-graphitic carbon include a resin-derived material, a petroleum pitch or a material derived from petroleum pitch, a petroleum coke or a material derived from petroleum coke, a plant-derived material, and an alcohol derived material.

The "hardly graphitizable carbon" refers to a carbon material in which the door is 0.36 nm or more and 0.42 nm or less.

The "easily graphitizable carbon" refers to a carbon material in which the $d_{002}$ is 0.34 nm or more and less than 0.36 nm.

The average particle size of the non-graphitic carbon may be, for example, 1 μm or more and 10 μm or less, and is preferably 2 μm or more and 5 μm or less from the viewpoint of enhancing the packing property of the negative active material in the negative electrode.

The content of the non-graphitic carbon in all the negative active materials is preferably 5% by mass or more and 40% by mass or less in some cases, and more preferably 10% by mass or more and 30% by mass or less in some cases. By setting the content of the non-graphitic carbon in the above range, the porosity of the negative electrode can be reduced, and an energy storage device including a negative electrode having a high packing density of the active material can be obtained.

The negative active material layer may further contain a negative active material other than graphite and non-graphitic carbon. Examples of other negative active materials include metals such as $S_1$, Sn, oxides of these metals, or composites of any of these metals and carbon materials. However, the content of the carbon material such as graphite and non-graphitic carbon in all the negative active materials is preferably 80% by mass or more, more preferably 90% by mass or more, still more preferably substantially 100% by mass in some cases.

The content of the negative active material in the positive active material layer is preferably 60% by mass or more and 99% by mass or less, more preferably 90% by mass or more and 98% by mass or less. When the content of the negative active material is in the above range, it is possible to achieve both high energy density and productivity of the negative active material layer.

The solvent-based binder is not particularly limited as long as it is a binder that is dispersed or dissolved in an organic solvent. For example, the solvent-based binder is preferably one that dissolves in an amount of less than 1 part by mass with respect to 100 parts by mass of water at 20° C. Examples of the binder dispersed or dissolved in the organic solvent include fluororesins (polytetrafluoroethylene (PTFE), polyvinylidene fluoride (PVDF), a copolymer of vinylidene fluoride and hexafluoropropylene, and the like), polyethylene, polypropylene, polyimide, copolymers of ethylene and vinyl alcohol, polyacrylonitrile, polyphosphazene, polysiloxane, polyvinyl acetate, polymethyl methacrylate, polystyrene, polycarbonate, polyamide, polyamideimide, crosslinked polymers of cellulose and chitosan pyrrolidone carboxylate, and derivatives of chitin or chitosan, and fluororesins are preferable, and PVDF is more preferable. One or two or more of the solvent-based binders can be used.

The content of the solvent-based binder in the negative active material layer is preferably 0.5% by mass or more and 10% by mass or less, and more preferably 1% by mass or more and 5% by mass or less. In the energy storage device including the negative active material layer in which the content of the solvent-based binder is in the above range, the application effect of the present aspect can be more suitably exhibited. In addition, it is possible to stably hold the active material.

In an embodiment of the present invention, the negative active material layer is disposed in a state of not subjected to pressing directly or via another layer to the negative electrode substrate. Also, in another embodiment of the present invention, R2/R1 that is a ratio of the surface roughness R2 of the negative electrode substrate in a region without the negative active material layer stacked to the surface roughness R1 of the negative electrode substrate in a region with the negative active material layer stacked is 0.90 or more. The lower limit of the ratio $(R_2/R_1)$ is preferably 0.92, more preferably 0.94. Meanwhile, the upper limit of the ratio (R2/R1) is preferably 1.10, more preferably 1.05. As described above, since the negative active material layer is not subjected to pressing or the ratio (R2/R1) is 0.90 or more, and the solvent-based binder is used for the negative active material layer, the capacity retention ratio after being left in a charged state can be increased, and the expansion of the negative electrode at initial charge can be suppressed.

The surface roughness R2 of the negative electrode substrate in the region without the negative active material layer stacked is, for example, 0.1 μm or more and 10 μm or less and may be 0.3 μm or more and 3 μm or less.

The density of the negative active material layer is not particularly limited, and for example, the lower limit thereof is preferably 0.8 g/cm$^3$, more preferably 1.0 g/cm$^3$, still more preferably 1.2 g/cm$^3$, even more preferably 1.4 g/cm$^3$. By setting the density of the negative active material layer to be equal to or more than the above lower limit, the energy density per volume can be increased, and the like. In addition, when solid graphite having a relatively small particle size is used as the graphite, the negative active material layer can have a high density without pressing the negative active material layer, so that it is possible to increase the capacity retention ratio after being left in a charged state while increasing the energy density per volume. Meanwhile, the upper limit of the density of the negative active material layer is preferably 1.8 g/cm$^3$, more preferably 1.6 g/cm$^3$ (for example, 1.55 g/cm$^3$), still more preferably 1.5 g/cm$^3$.

The density of the negative active material layer is a value obtained by dividing the mass (g/cm$^2$) per unit area of the negative active material layer by the average thickness (cm). The average thickness of the negative active material layer is an average value of thicknesses measured at five positions for each of ten negative electrodes cut into 2 cm×1 cm. Also, the thickness of the negative active material layer can be measured using a high-accuracy digimatic micrometer manufactured by Mitutoyo Corporation.

The average thickness (when the negative active material layer is formed on both surfaces of the negative electrode substrate, the total thickness of both surfaces, typically, the average thickness in full charge) of the negative active material layer is not particularly limited, but for example, the lower limit is preferably 50 μm, more preferably 60 μm, still more preferably 70 μm, even more preferably 80 μm. In some aspects, the lower limit of the average thickness of the negative active material layer may be, for example, 85 μm, typically 90 μm (for example, 95 μm). Meanwhile, the upper limit of the average thickness of the negative active material layer is, for example, preferably 300 μm, more preferably 250 μm, still more preferably 200 μm. In some aspects, the upper limit of the average thickness of the negative active material layer may be, for example, 180 μm, typically 150 μm (for example, 120 μm). In the energy storage device including the negative active material layer having the above average thickness, the application effect of the present aspect can be more suitably exhibited.

The porosity of the negative active material layer is not particularly limited, but the upper limit thereof is, for example, preferably 60%, more preferably 55%. In some aspects, the porosity of the negative active material layer may be, for example, 45% or less, typically 35% or less (for example, 32% or less). Meanwhile, the lower limit of the porosity of the negative active material layer is, for example, preferably 20%, more preferably 22%. In some aspects, the porosity of the negative active material layer may be, for example, 24% or more, typically 25% or more. Within such a range of the porosity of the negative active material layer, an energy storage device having a high battery capacity (energy density) per volume can be realized. In the present specification, the porosity of the negative active material layer is determined by a calculation formula of $(1-V_2/V_1)\times 100$, where an apparent volume (volume including voids) of the negative active material layer is defined as $V_1$ and a sum of actual volumes of materials constituting the negative active material layer is defined as $V_2$. The sum $V_2$ of actual volumes of the materials constituting the negative active material layer can be calculated from the content of each material in the negative active material layer and the true density of each material.

[Separator]

As the shape of the separator, for example, a woven fabric, a nonwoven fabric, a porous resin film, and the like are used. Among them, a porous resin film is preferable from the viewpoint of strength, and a nonwoven fabric is preferable from the viewpoint of liquid retention property of the nonaqueous electrolyte solution. As a main component of the separator, a polyolefin such as polyethylene or polypropylene is preferable from the viewpoint of strength, and polyimide, aramid or the like is preferable from the viewpoint of resistance to oxidation and decomposition. These resins may be composited.

An inorganic layer may be disposed between the separator and the electrode (usually, the positive electrode). This inorganic layer is a porous layer, which is also called a heat resistant layer and the like. A separator having an inorganic layer formed on one surface both surfaces of the porous resin film can also be used. The inorganic layer is usually composed of inorganic particles and a binder, and may contain other components.

[Nonaqueous Electrolyte Solution]

As the nonaqueous electrolyte solution, a known nonaqueous electrolyte solution normally used for a general nonaqueous electrolyte solution secondary battery (energy storage device) can be used. The nonaqueous electrolyte solution usually contains a nonaqueous solvent and an electrolyte salt dissolved in the nonaqueous solvent.

As the nonaqueous solvent, it is possible to use a known nonaqueous solvent usually used as a nonaqueous solvent of a general nonaqueous electrolyte solution for an energy storage device. Examples of the nonaqueous solvent include cyclic carbonate, chain carbonate, ester, ether, amide, sulfone, lactone, and nitrile. Among them, it is preferable to use at least one of the cyclic carbonate and the chain carbonate, and it is more preferable to use the cyclic carbonate and the chain carbonate in combination. When the cyclic carbonate and the chain carbonate are used in combination, the volume ratio of the cyclic carbonate to the chain carbonate (cyclic carbonate:chain carbonate) is not particularly limited but is preferably from 5:95 to 50:50, for example.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these, EC is preferable.

Examples of the chain carbonate include diethyl carbonate (DEC), dimethyl carbonate (DMC), ethyl methyl carbonate (EMC), and diphenyl carbonate, and among these, EMC is preferable.

As the electrolyte salt, it is possible to use a known electrolyte salt usually used as an electrolyte salt of a general nonaqueous electrolyte solution for an energy storage device. Examples of the electrolyte salt include a lithium salt, a sodium salt, a potassium salt, a magnesium salt, and an onium salt, and a lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a hydrocarbon group in which hydrogen is replaced by fluorine, such as $LiSO_3CF_3$, $LiN(SO_2CF_3)_2$, $LiN(SO_2C_2F_5)_2$, $LiN(SO_2CF_3(SO_2C_4F_9)$, $LiC(SO_2CF_3)_3$ and $LiC(SO_2C_2F_5)_3$. Among them, an inorganic lithium salt is preferable, and $LiPF_6$ is more preferable.

The lower limit of the content of the electrolyte salt in the nonaqueous electrolyte solution is preferably 0.1 $mol/dm^3$, more preferably 0.3 $mol/dm^3$, still more preferably 0.5 $mol/dm^3$, and particularly preferably 0.7 $mol/dm^3$. Meanwhile, the upper limit is not particularly limited, but preferably 2.5 $mol/dm^3$, more preferably 2 $mol/dm^3$, and still more preferably 1.5 $mol/dm^3$.

The nonaqueous electrolyte solution may contain an additive. Examples of the additive include aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, and tetraldstrimethylsilyl titanate. These additives may be used singly, or two or more may be mixed and used.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, and particularly preferably 0.3% by mass or more and 3% by mass or less, with respect to a total mass of the nonaqueous electrolyte solution. When the content of the additive is in the above range, it is possible to improve capacity retention performance or cycle performance after high-temperature storage, and to further improve safety.

[Specific Configuration of Energy Storage Device]

Figure 2:
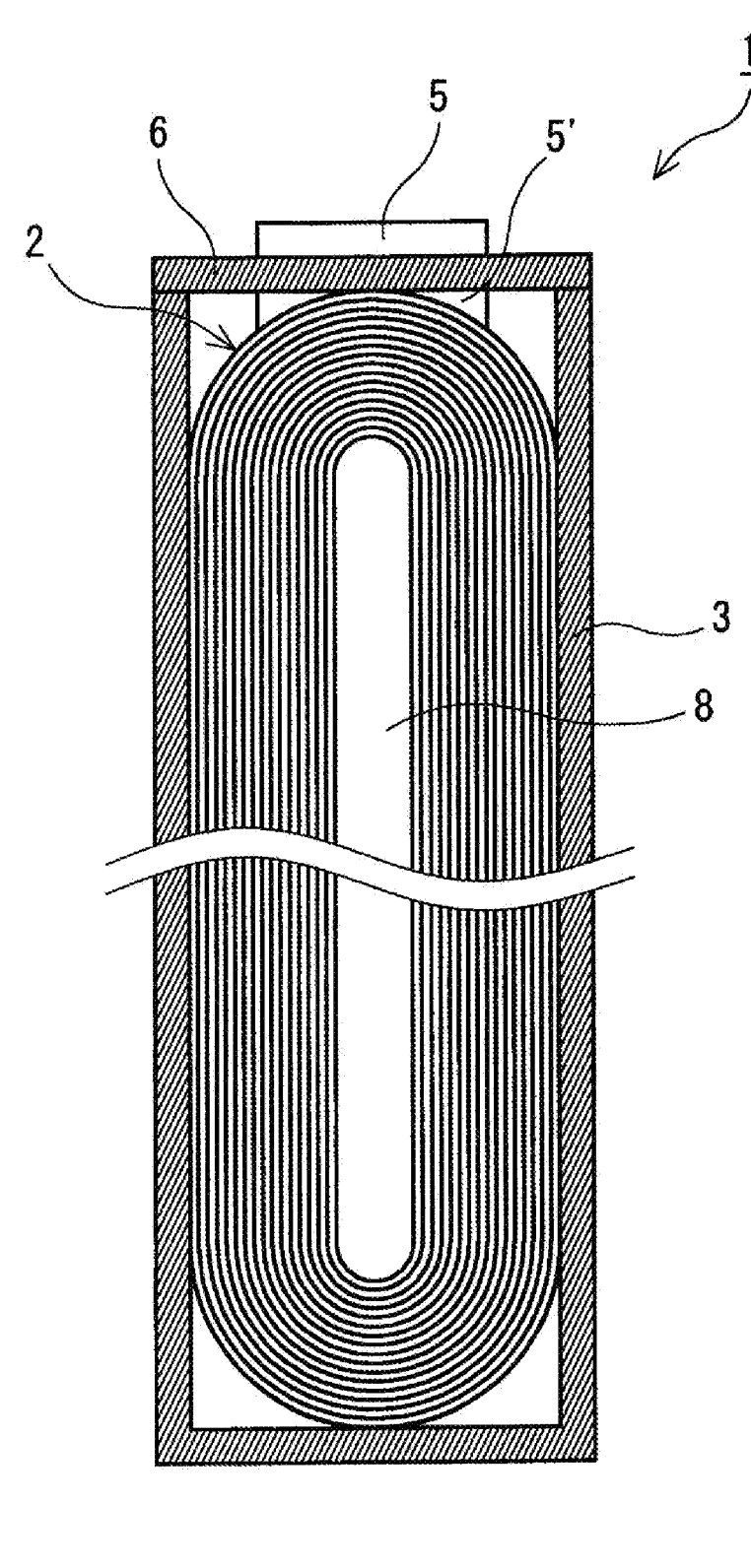
FIG. 2 is a schematic cross-sectional view of the energy storage device in one embodiment of the present invention.

Next, a specific configuration example of an energy storage device according to one embodiment of the present invention will be described. FIG. 1 is a schematic exploded perspective view illustrating an electrode assembly and a case of an energy storage device according to one embodiment of the present invention. FIG. 2 is a schematic cross-sectional view of the energy storage device in FIG. 1. An energy storage device 1 includes an electrode assembly 2, a positive current collector 4' and a negative current collector 5', which are connected to both ends of the electrode assembly 2, respectively, and a case 3 for housing the current collectors. In the energy storage device 1, the electrode assembly 2 is housed in the case 3, and the nonaqueous electrolyte solution is disposed in the case 3. The electrode assembly 2 is formed by winding, into a flat shape, a positive electrode provided with a positive active material and a negative electrode provided with a negative active material with a separator interposed therebetween. In the present embodiment, a winding-axis direction of the electrode assembly 2 is defined as a Z-axis direction, and a long-axis direction in a cross section perpendicular to the Z-axis of the electrode assembly 2 is defined as an X-axis direction. The direction perpendicular to the Z-axis and the X-axis is defined as a Y-axis direction.

An exposed region of the positive electrode substrate on which the positive active material layer is not stacked is present at the end of the positive electrode in one direction. Also, an exposed region of the negative electrode substrate on which the negative active material layer is not stacked is present at the end of the negative electrode in one direction. The positive current collector 4' is electrically connected to the exposed region of the positive electrode substrate by clamping with a clip, welding, or the like, and the negative current collector 5' is similarly electrically connected to the exposed region of the negative electrode substrate. The positive electrode is electrically connected to a positive electrode terminal 4 via a positive current collector 4', and the negative electrode is electrically connected to a negative electrode terminal 5 via a negative current collector 5'.

The case 3 is a rectangular parallelepiped housing that houses the electrode assembly 2, the positive current collector 4', and the negative current collector 5', and in which one surface (upper surface) perpendicular to the second direction (X direction) is opened. Specifically, the case 3 has a bottom surface, a pair of long side surfaces facing in the third direction (Y direction), and a pair of short-side surfaces facing in the first direction (Z direction). The inner surface of the case 3 directly contacts the outer surface of the electrode assembly 2 (usually, the separator). The case 3 may include a spacer, a sheet, or the like interposed between the case 3 and the electrode assembly 2. The material of the spacer, the sheet, or the like is not particularly limited so long as having an insulating property. When the case 3 includes a spacer, a sheet, or the like, the inner surface of the case 3 indirectly contacts the outer surface of the electrode assembly 2 via the spacer, the sheet, or the like.

The upper surface of the case 3 is covered with a lid 6. The case 3 and the lid 6 are made of a metal plate, a resin plate or the like. As the material of the metal plate, for example, aluminum can be used.

The lid 6 is provided with a positive electrode terminal 4 and a negative electrode terminal 5 that conduct electricity to the outside. The positive electrode terminal 4 is connected to the positive current collector 4', and the negative electrode terminal 5 is connected to the negative current collector 5'. Further, usually, a nonaqueous electrolyte solution is injected into the case 3 from an injection hole (not shown) provided in the lid 6.

The electrode assembly 2 has a positive electrode, a negative electrode and a separator that insulates the electrodes, in which the positive electrode and the negative electrode are alternately stacked with the separator interposed therebetween. The electrode assembly 2 is a wound-type electrode assembly obtained by winding, into a flat shape, a sheet body including the positive electrode, the negative electrode, and the separator.

The electrode assembly 2 preferably has a hollow region in a central portion 8. Further, in the case where the electrode assembly 2 is composed of the positive electrode and the negative electrode wound around a winding core with the separator interposed between the electrodes, the electrode assembly preferably has a hollow region in the central portion 8 of the electrode assembly, with a hollow structure as the internal structure of the winding core, or partially with a gap out of close contact with the outer surface of the winding core. In the case where a wound-type electrode assembly obtained by winding stacked negative electrodes and positive electrodes has a hollow without any electrode plate (positive electrode or negative electrode) or separator as the innermost periphery of the electrode assembly, the negative electrode may partially move into the hollow if the negative electrode expands. In particular, because the negative electrode near the inner periphery is close to the hollow, the negative electrode may move toward the hollow, thereby resulting in an increased interelectrode distance between the positive electrodes and the negative electrodes. The behavior at the inner periphery of such a wound-type electrode assembly is likely to be caused in the case of the outer peripheral surface of the electrode assembly in contact with the inner surface of the case, because the electrode assembly is unlikely to move toward the outer peripheral surface. As described above, with an increased interelectrode distance caused between the positive electrodes and the negative electrode, the part with the increased interelectrode distance has a resistance increased, thereby making the charge-discharge reaction less likely to be developed, and then leading to the charge-discharge reaction concentrated in the region near the part with the increased interelectrode distance. Because of this charge-discharge reaction concentrated, uneven charge-discharge will be expected to occur near the inner periphery. The electrode assembly 2 has the hollow region in the central portion 8, thereby making it possible to keep the active material layer from being peeled off by bending the positive electrode or negative electrode located near the central portion 8, and the enhanced suppressive effect on the expansion of the negative electrode during initial charge makes it possible to obtain an energy storage device 1 that can suppress uneven charge-discharge caused by the increased interelectrode distance, which has been conventionally caused in an electrode assembly with a hollow region.

The material of the winding core is not particularly limited as long as the material has insulating properties and is stable in the electrolyte solution. Examples of the material of the winding core include polyethylene and polypropylene.

[Pressure-Sensitive Electrically Disconnecting Mechanism and Pressure-Sensitive Electrically Short-Circuiting Mechanism]

The energy storage device according to one embodiment of the present invention preferably includes a pressure-sensitive disconnecting mechanism that disconnects the electrical connection between the positive electrode and the negative electrode, or a pressure-sensitive short-circuiting mechanism that electrically short-circuits the positive electrode and the negative electrode outside the electrode assembly, in the case where an internal pressure rises to a predetermined pressure (preferably a pressure of 0.2 MPa or more and 1.0 MPa or lower). When the energy storage device is subjected to overcharge or the decomposition of the nonaqueous electrolyte solution, the internal pressure or temperature may rise significantly to the extent that it is not possible to exhibit the charge-discharge performance required for the energy storage device. For that reason, conventionally, further improvements in safety are made by providing energy storage devices with a mechanism that disconnects the electrical connection between the positive electrode and the negative electrode or electrically short-circuits the positive electrode and the negative electrode outside the electrode assembly, for example, with a diaphragm inverted, in the case where the internal pressure rises due to overcharge or the like. These mechanisms have, however, the possibility of increasing the internal pressures of the energy storage devices with the increased amount of expansion of the plates, thereby causing the above-mentioned mechanisms to operate at early stages. The energy storage device according to one embodiment of the present invention includes the mechanism that disconnects the electrical connection between the positive electrode and the negative electrode or the mechanism that electrically short-circuits the positive electrode and the negative electrode outside the electrode assembly, thereby allowing the safety to be further improved, and the energy storage device has an enhanced suppressive effect on the expansion of the negative electrode during initial charge, thereby making it possible to keep the above-mentioned mechanism from operating at early stages.

These mechanisms are operated by increasing the internal pressure of the energy storage device in case of an event such as overcharge, with, in the nonaqueous electrolyte solution, a compound that promotes gas generation during temperature rise or voltage rise.

The pressure-sensitive electrically disconnecting mechanism is provided, for example, in a conductive path between the positive electrode and the positive electrode terminal, a conductive path between the negative electrode and the negative electrode terminal, or the like. When the pressure-sensitive electrically disconnecting mechanism is operated, no charge current flows, thus allowing the voltage of the energy storage device to be kept from being increased, and further improving the safety in the case of overcharge. In the case of the pressure-sensitive electrically disconnecting mechanism, for example, when the internal pressure of the energy storage device is increased by the energy storage device overcharged, the central part of the diaphragm is lifted to break the conductive path and then interrupt the current. Thus, further charge is blocked in the case of the energy storage device overcharged.

The pressure-sensitive electrically short-circuiting mechanism is provided, for example, outside the electrode assembly (for example, the negative electrode current collector 5' in FIG. 1). In the pressure-sensitive electrically short-circuiting mechanism, in the case where the energy storage device overcharged makes the internal pressure of the energy storage device equal to or more than a predetermined value, the central part of the metallic diaphragm is lifted to bring the diaphragm into contact with the conductive member, thereby short-circuiting the positive electrode and the negative electrode. This makes it possible to prevent the charge current from flowing into the electrode assembly. This short circuit is caused outside the electrode assembly, thus making it possible to keep the temperature of the energy storage device from being increased by the exothermic reaction of the active material layer as in the case of a short circuit caused inside the electrode assembly. In this manner, the safety in the case of the energy storage device overcharged is further improved.

[Pressurizing Member]

The energy storage device according to one embodiment of the present invention preferably includes a pressurizing member that pressurizes the case from the outside. The energy storage device has an enhanced suppressive effect on the expansion of the negative electrode during initial charge, thereby possibly decreasing the force of friction against the inner surface of the case due to the expansion of the electrode assembly, and also causing the electrode assembly to move inside the case. The energy storage device includes the pressurizing member that pressurizes the case from the outside, thereby making it possible to increase the force of friction between the case and the electrode assembly and improve the holding ability for the electrode assembly.

Examples of the pressurizing member include a restraining band or a metallic frame attached to the outer periphery of the case.

<Method for Manufacturing Energy Storage Device>

A method for manufacturing an energy storage device according to an embodiment of the present invention includes stacking a negative active material layer on a negative electrode substrate directly or via another layer, and preparing a nonaqueous electrolyte solution.

In the step of stacking a negative active material layer on a negative electrode substrate directly or via another layer, the negative active material layer can be disposed along at least one surface of the negative electrode substrate by applying a negative composite to the negative electrode substrate. Specifically, for example, a negative composite is applied to the negative electrode substrate, and dried to stack the negative active material layer. As described above, the negative active material layer contains graphite and a solvent-based binder. That is, the negative composite contains graphite and a solvent-based binder.

The negative composite may be a negative composite paste containing a dispersion medium in addition to the graphite, the solvent-based binder, and the optional components described above. As the dispersion medium, an organic solvent such as N-methylpyrrolidone (NMP) or toluene can be used.

A negative electrode is prepared through the step of stacking a negative active material layer on a negative electrode substrate directly or via another layer. The manufacturing method does not include subjecting the negative active material layer to pressing. The method for manufacturing an energy storage device according to one embodiment of the present invention may include a step of preparing a negative electrode having an unpressed negative active material layer.

In the step of preparing a nonaqueous electrolyte solution, for example, a nonaqueous electrolyte solution can be prepared by mixing components constituting the nonaqueous electrolyte solution, such as an electrolyte salt and a non-aqueous solvent.

The manufacturing method may further include preparing a positive electrode, stacking the positive electrode and the negative electrode with a separator interposed therebetween to obtain an electrode assembly, housing the electrode assembly in a case, injecting a nonaqueous electrolyte solution into the case, and the like.

In the step of preparing a positive electrode, a positive active material layer containing a positive active material can be disposed along at least one surface of the positive electrode substrate by applying a positive composite to the positive electrode substrate. Specifically, a positive composite is applied to the positive electrode substrate, and dried to stack the positive active material layer. The positive composite may be a positive composite paste containing a dispersion medium. The dispersion medium may be water or the like in addition to the organic solvent exemplified for the negative composite. The positive electrode may be subjected to pressing by using a roll press or the like.

In addition to the above step, for example, a step of housing the electrode assembly in a case and injecting a nonaqueous electrolyte solution into the case is included. After the nonaqueous electrolyte solution is injected into the case, the electrode assembly may be housed in the case. Thereafter, an injection port is sealed, thereby allowing an energy storage device to be obtained. The details of each element constituting the energy storage device obtained by the manufacturing method are as described above.

[Other Embodiments]

The energy storage device of the present invention is not limited to the above-described embodiment. In the above embodiment, the energy storage device is a nonaqueous electrolyte solution secondary battery, but other energy storage devices may be used. Examples of the other energy storage devices include capacitors (electric double-layer capacitors and lithium ion capacitors).

Although a mode using the wound-type electrode assembly has been mainly described in the above embodiment, a stacked electrode assembly may be provided which is formed of a layered product where a plurality of sheet bodies having a positive electrode, a negative electrode, and a separator are laminated.

The present invention can also be realized as an energy storage apparatus including a plurality of the energy storage devices. An energy storage unit can be constituted using one or a plurality of energy storage devices (cells) of the present invention, and an energy storage apparatus can be constituted using the energy storage unit. In this case, the technique of the present invention may be applied to at least one energy storage device included in the energy storage unit or the energy storage apparatus. The energy storage apparatus can be used as a power source for an automobile, such as an electric vehicle (EV), a hybrid vehicle (HEV), or a plug-in hybrid vehicle (PHEV). The energy storage apparatus can be used for various power source apparatuses such engine starting power source apparatuses, auxiliary power source apparatuses, and uninterruptible power systems (UPSs).

Figure 3:
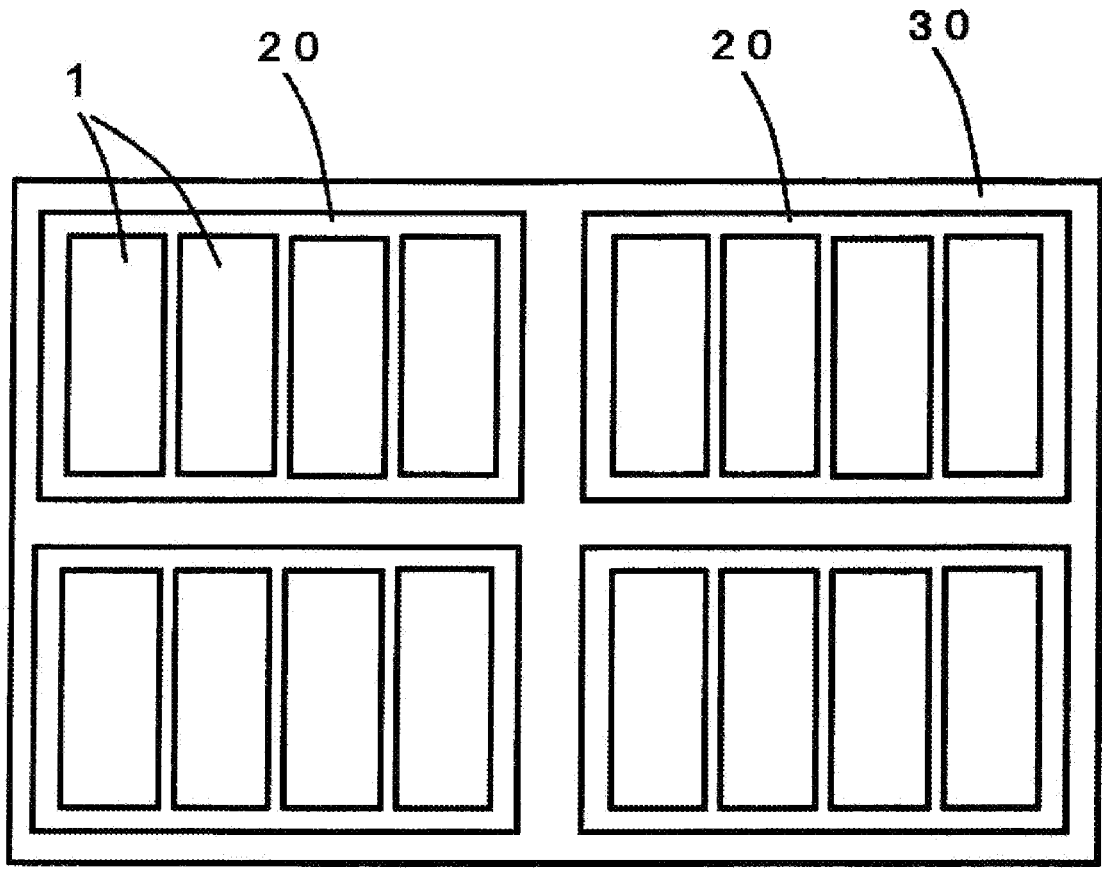
FIG. 3 is a schematic view illustrating an energy storage apparatus configured by aggregating a plurality of the energy storage devices in one embodiment of the present invention.

FIG. 3 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1 and a busbar (not illustrated) for electrically connecting two or more energy storage units 20. The energy storage unit 20 or the energy storage apparatus 30 may include a state monitor (not illustrated) for monitoring the state of one or more energy storage devices.

EXAMPLES

Hereinafter, the present invention will be described in more detail with reference to Examples, but the present invention is not limited to the following Examples.

Example 1

(Preparation of Negative Electrode)

Figure 4:
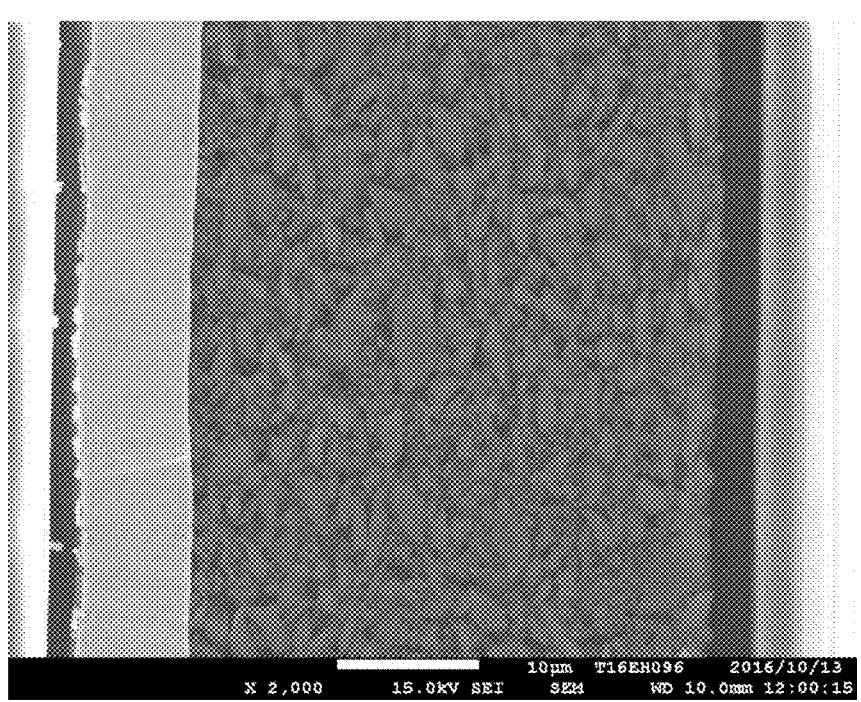
FIG. 4 is SEM image of the artificial graphite A used in Example 1 at the magnification of 2000×.
Figure 5:
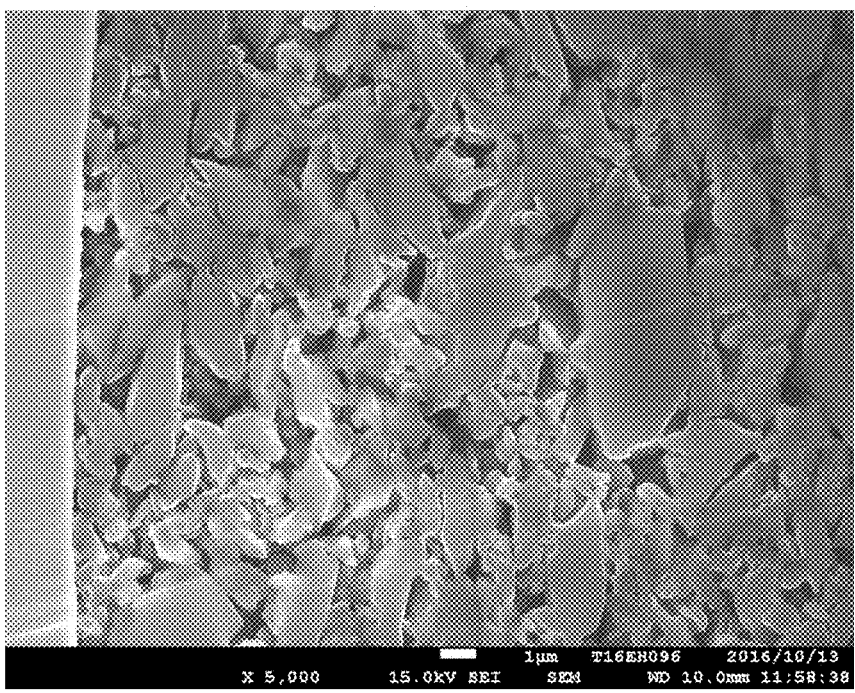
FIG. 5 is SEM image of the artificial graphite A used in Example 1 at the magnification of 5000×.

A negative composite paste containing graphite A (solid graphite, average particle size 3 μm) as a negative active material and PVDF (solvent-based binder) as a binder and using NMP as a dispersion medium was prepared. The SEM images of the artificial graphite A at the magnification of 2000× and at the magnification of 5000× are shown in FIGS. 4 and 5, respectively. A mass ratio of the negative active material and the binder was 95:5. The negative composite paste was applied to both surfaces of a copper foil substrate (surface roughness Ra 0.74 μm) and dried to form a negative active material layer, thereby obtaining a negative electrode of Example 1. The negative active material layer was not subjected to pressing.

In the obtained negative electrode, the area ratio R of graphite excluding voids in the particles, the average thickness of the negative active material layer before charging/discharging, the density of the negative active material layer, the porosity of the negative active material layer, and the ratio of the surface roughness of the negative electrode substrate (R2/R1) were measured by the above-described method.

(Preparation of Positive Electrode)

A positive composite paste, containing $LiNi_{1/3}Co_{1/3}Mn_{1/3}O_2$ as the positive active material, PVDF as a binder and acetylene black as a conductive agent and using NMP as a dispersion medium, was prepared. A mass ratio of the positive active material, the binder and the conductive agent was 94:3:3. The positive composite paste was applied to both surfaces of an aluminum foil substrate and dried. Thereafter, pressing was performed to form a positive active material layer, thereby obtaining a positive electrode.

(Preparation of Nonaqueous Electrolyte Solution)

A nonaqueous electrolyte solution was prepared by mixing $LiPF_6$ as an electrolyte salt so as to have a content of 1.2 $mol/dm^3$ in a nonaqueous solvent obtained by mixing EC, EMC, and DMC at a volume ratio of 30:35:35.

(Assembly of Energy Storage Device)

The positive electrode and the negative electrode, and a polyethylene separator with a thickness of 20 μm were wound in a stacked state to prepare a wound-type electrode assembly. The winding-type electrode assembly was prepared by arranging a winding core formed by welding a polypropylene resin sheet with a thickness of 0.3 mm in a state of being rolled into a track shape in the center. The wound-type electrode assembly was housed in a case. At this time, the outer peripheral surface of the wound-type electrode assembly was brought into contact with the inner surface of the case via an insulating sheet. Subsequently, the nonaqueous electrolyte solution was injected into the case to obtain an energy storage device of Example 1.

Examples 2 to 3, Comparative Examples 1 to 6

Negative electrodes of Examples 2 to 3 and Comparative Examples 1 to 6 were prepared similarly to Example 1 except that negative active materials and binders shown in Table 1 were used in the preparation of the negative electrode, and the presence or absence of pressing on the negative active material layer was as shown in Table 1. In addition, energy storage devices of Examples 2 to 3 and Comparative Examples 1 to 6 were obtained similarly to Example 1 except that the negative electrodes of Examples 2 to 3 and Comparative Examples 1 to 6 were used.

In each of Comparative Examples in which a styrene butadiene rubber (SBR) was used as a binder, a negative composite paste, containing a negative active material, styrene-butadiene rubber (SBR) as a binder and carboxymethyl cellulose (CMC) as a thickener and using water as a dispersion medium, was prepared. A mass ratio of the negative active material, the binder, and the thickener was 97.4=2.0=0.6.

In each of the comparative examples with pressing, the negative active material layer was pressed using a roll press so as to have a pressure (linear pressure) of 40 kgf/mm or more.

Also in the obtained negative electrodes of Examples and Comparative Examples, as in Example 1, the area ratio R of graphite excluding voids in the particles, the average thickness of the negative active material layer before charging/discharging, the density of the negative active material layer, and the ratio of the surface roughness of the negative electrode substrate (R2/R1) were measured. In each of Examples 1 to 3 and Comparative Examples 1 to 6, the area ratio R of graphite excluding voids in the particles, the density of the negative active material layer, the porosity of the negative active material layer, and the ratio of the surface roughness of the negative electrode substrate (R2/R1) are shown in Table 1.

[Evaluation]

(Amount of Expansion of Negative Active Material at Initial Charge)

Each of the obtained energy storage devices was charged once with constant current and constant voltage (CCCV) in a thermostatic bath at 25° C. under the conditions of a charge current (⅓ C with respect to a design (rated) capacity) and an end-of-charge voltage of 4.15 V until the charge current reached 0.01° C. or less to be in a fully charged state. In a glove box filled with argon with a dew point value of −60° C. or less, the energy storage device in a fully charged state was disassembled, and the negative electrode was cleaned with dimethyl carbonate (DMC). Using the cleaned negative electrode, the average thickness of the negative active material layer in full charge was measured by the method described above. The amount of expansion of the negative active material at initial charge was determined by subtracting the "thickness of the negative active material layer before charging/discharging" from the "thickness of the negative active material layer in full charge". The results are shown in Table 1.

(Capacity Retention Ratio after being Left)

Each of the obtained energy storage devices was charged with constant current and constant voltage (CCCV) in a thermostatic bath at 25° C. under conditions of a charge current of ⅓ C and an end-of-charge voltage of 4.15 V until the charge current reached 0.01° C. or less, and then discharged at a constant current (CC) under conditions of a discharge current of 1° C. and an end-of-discharge voltage of 2.75 V, and initial discharge capacity was measured. Subsequently, constant current constant voltage (CCCV) charge was performed in a thermostatic bath at 25° C. under conditions of a charge current of ⅓ C and an end-of-charge voltage of 4.15 V until the charge current reached 0.01° C.

or less to be in a fully charged state, and the energy storage device was left in an atmosphere at 60° C. for 200 days. After being left, constant current (CC) discharge was performed with a discharge current of 1° C. and a lower limit voltage of 2.75 V in an atmosphere of 25° C., and the discharge capacity after being left was measured. The discharge capacity after being left with respect to the initial discharge capacity was determined as a capacity retention ratio after being left. The results are shown in Table 1.

paring Examples 1 to 3, it is found that in Example 1 in which solid graphite with a small average particle size is used as the negative active material and the porosity of the negative active material layer is small, the capacity retention ratio after being left in a charged state is further high. In addition, based on Examples and Comparative Examples, it is found that the expansion of the negative electrode at initial charge can be suppressed by not pressing the negative active material layer.

TABLE 1

| | | | | | | | Ratio of surface roughness of negative substrate (R2/R1) | Porosity of negative active material layer (%) | Density of negative active material layer (g/cm³) | Evaluation | |
|---|---|---|---|---|---|---|---|---|---|---|---|
| | Negative active material | | | | | | | | | Amount of expansion (μm) | Capacity retention ratio after being left (%) |
| | Type | Solid/ hollow | Area ratio R (%) | Average particle size (μm) | Binder Type | Pressing Yes or no | | | | | |
| Example 1 | Graphite A | Solid | 99.1 | 3 | PVDF | No | 0.97 | 32 | 1.48 | 8 | 60 |
| Example 2 | Graphite B | Solid | 98.1 | 20 | PVDF | No | 0.97 | 55 | 0.98 | 12 | 47 |
| Comparative Example 1 | Graphite B | Solid | 98.1 | 20 | SBR | No | 0.97 | 54 | 0.98 | 12 | 14 |
| Comparative Example 2 | Graphite B | Solid | 98.1 | 20 | PVDF | Yes | 0.75 | 35 | 1.42 | 20 | 29 |
| Comparative Example 3 | Graphite B | Solid | 98.1 | 20 | SBR | Yes | 0.75 | 34 | 1.42 | 20 | 11 |
| Example 3 | Graphite C | Hollow | 88.8 | 8 | PVDF | No | 0.97 | 55 | 0.98 | 13 | 42 |
| Comparative Example 4 | Graphite C | Hollow | 88.8 | 8 | SBR | No | 0.97 | 54 | 0.98 | 13 | 11 |
| Comparative Example 5 | Graphite C | Hollow | 88.8 | 8 | PVDF | Yes | 0.82 | 35 | 1.42 | 20 | 26 |
| Comparative Example 6 | Graphite C | Hollow | 88.8 | 8 | SBR | Yes | 0.82 | 34 | 1.42 | 22 | 9 |

As shown in Table 1, for example, comparison between Example 2 and Comparative Examples 1 to 3 shows that PVDF which is a solvent-based binder is used as a binder, and the negative active material layer is not pressed, thereby increasing the capacity retention ratio after being left in a charged state. For example, in Example 2 in which PVDF which is a solvent-based binder was used as a binder and the negative active material layer was not pressed, the capacity retention ratio after being left in a charged state could be significantly increased as compared with Comparative Example 2 in which PVDF which is a solvent-based binder was used as a binder and the negative active material layer was pressed. On the other hand, in Comparative Example 1 in which SBR which is a water-based binder was used as a binder and the negative active material layer was not pressed, the capacity retention ratio after being left in a charged state was slightly increased as compared with Comparative Example 3 in which SBR which is a water-based binder was used as a binder and the negative active material layer was not pressed, but performance improvement effect was not recognized as compared with Example 2. Comparison between Example 3 and Comparative Examples 4 to 6 shows a similar tendency. From this, it has been confirmed that the effect of improving the capacity retention ratio after being left in a charged state is achieved more when the solvent-based binder and the unpressed negative active material layer are used in combination than when the water-based binder and the unpressed negative active material layer are used in combination. In other words, by using the solvent-based binder and the unpressed negative active material layer in combination, it can be said that an energy storage device having a high capacity retention ratio after being left in a charged state can be obtained as a synergistic effect by such combination. Further, com-

INDUSTRIAL APPLICABILITY

The present invention is suitably used as an energy storage device including a nonaqueous electrolyte solution secondary battery used as a power source for electronic devices such as personal computers and communication terminals, automobiles, and the like.

DESCRIPTION OF REFERENCE SIGNS

1: energy storage device
2: electrode assembly
3: case
4: positive electrode terminal
4': positive current collector
5: negative electrode terminal
5': negative current collector
6: lid
8: central portion
20: energy storage unit
30: energy storage apparatus

The invention claimed is:

1. An energy storage device comprising a negative electrode having a negative electrode substrate and a negative active material layer stacked on the negative electrode substrate, and a nonaqueous electrolyte solution, wherein the negative active material layer contains graphite and a solvent-based binder, the graphite contains artificial solid graphite having an average particle size of 10 μm or less, an area ratio excluding voids in a particle of the artificial solid graphite to a total area of the particle of the artificial solid graphite is 95% or more in a cross section of the particle of the artificial solid graphite observed in a scanning electron microscope (SEM) image, and the negative active material layer is not subjected to pressing.

2. An energy storage device comprising a negative electrode having a negative electrode substrate and a negative active material layer stacked on the negative electrode substrate, and a nonaqueous electrolyte solution, wherein the negative active material layer contains graphite and a solvent-based binder, the graphite contains artificial solid graphite having an average particle size of 10 μm or less, an area ratio excluding voids in a particle of the artificial solid graphite to a total area of the particle of the artificial solid graphite is 95% or more in a cross section of the particle of the artificial solid graphite observed in a scanning electron microscope (SEM) image, and a ratio of surface roughness of the negative electrode substrate in a region without the negative active material layer stacked to surface roughness of the negative electrode substrate in a region with the negative active material layer stacked is 0.90 or more.

3. The energy storage device according to claim 1, wherein the negative active material layer has a porosity of 35% or less.

4. The energy storage device according to claim 1, wherein the negative active material layer does not contain scale-like graphite particles.

5. A method for manufacturing an energy storage device, the method comprising:

stacking a negative active material layer on a negative electrode substrate; and preparing a nonaqueous electrolyte solution, wherein the negative active material layer contains graphite and a solvent-based binder, the graphite contains artificial solid graphite having an average particle size of 10 μm or less, an area ratio excluding voids in a particle of the artificial solid graphite to a total area of the particle of the artificial solid graphite is 95% or more in a cross section of the particle of the artificial solid graphite observed in a scanning electron microscope (SEM) image, and the method does not comprise subjecting the negative active material layer to pressing.

6. The energy storage device according to claim 2, wherein the negative active material layer has a porosity of 35% or less.

7. The energy storage device according to claim 2, wherein the negative active material layer does not contain scale-like graphite particles.

8. The energy storage device according to claim 1, wherein the negative active material layer has a porosity of 35% or less, and the negative active material layer does not contain scale-like graphite particles.

9. The energy storage device according to claim 2, wherein the negative active material layer has a porosity of 35% or less, and the negative active material layer does not contain scale-like graphite particles.

10. The method according to claim 5, wherein the negative active material layer has a porosity of 35% or less, and the negative active material layer does not contain scale-like graphite particles.

11. The energy storage device according to claim 1, wherein the average particle size of the artificial solid graphite is 3 μm or less.

12. The energy storage device according to claim 1, further comprising a positive electrode having a positive electrode substrate and a positive active material layer stacked on the positive electrode substrate, wherein the positive active material layer contains lithium transition metal composite oxides of $LiNi_{1/3}Co_{1/3}Mn_{1/3}O_2$ as a positive active material.

13. The energy storage device according to claim 2, wherein the average particle size of the artificial solid graphite is 3 μm or less.

14. The energy storage device according to claim 2, further comprising a positive electrode having a positive electrode substrate and a positive active material layer stacked on the positive electrode substrate, wherein the positive active material layer contains lithium transition metal composite oxides of $LiNi_{1/3}Co_{1/3}Mn_{1/3}O_2$ as a positive active material.

15. The method according to claim 5, wherein the average particle size of the artificial solid graphite is 3 μm or less.

16. The method according to claim 5, further comprising stacking a positive active material layer on a positive electrode substrate, wherein the positive active material layer contains lithium transition metal composite oxides of $LiNi_{1/3}Co_{1/3}Mn_{1/3}O_2$ as a positive active material.

* * * * *